United States Patent
Ahsan et al.

(10) Patent No.: US 12,407,857 B2
(45) Date of Patent: Sep. 2, 2025

(54) METHOD, AN APPARATUS AND A COMPUTER PROGRAM PRODUCT FOR VIDEO CONFERENCING

(71) Applicant: Nokia Technologies Oy, Espoo (FI)

(72) Inventors: Saba Ahsan, Espoo (FI); Sujeet Shyamsundar Mate, Tampere (FI); Yu You, Kangasala (FI); Emre Baris Aksu, Tampere (FI); Igor Danilo Diego Curcio, Tampere (FI); Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 80 days.

(21) Appl. No.: 17/814,288

(22) Filed: Jul. 22, 2022

(65) Prior Publication Data
US 2023/0033063 A1 Feb. 2, 2023

(30) Foreign Application Priority Data
Jul. 27, 2021 (FI) ..................................... 20215820

(51) Int. Cl.
*H04N 19/597* (2014.01)
*H04N 7/14* (2006.01)
*H04N 13/194* (2018.01)

(52) U.S. Cl.
CPC ........... *H04N 19/597* (2014.11); *H04N 7/142* (2013.01); *H04N 13/194* (2018.05)

(58) Field of Classification Search
None
See application file for complete search history.

(56) References Cited

U.S. PATENT DOCUMENTS

| | | |
|---|---|---|
| 2014/0320587 A1 | 10/2014 | Oyman |
| 2018/0124146 A1 | 5/2018 | Chen et al. |
| 2018/0164593 A1 | 6/2018 | Van Der Auwera et al. |
| 2018/0167613 A1 | 6/2018 | Hannuksela et al. |
| 2018/0249163 A1 | 8/2018 | Curcio et al. |

(Continued)

FOREIGN PATENT DOCUMENTS

| | | |
|---|---|---|
| WO | 2019/048733 A1 | 3/2019 |
| WO | 2019/073112 A1 | 4/2019 |

(Continued)

OTHER PUBLICATIONS

"High Efficiency Video Coding", Series H: Audiovisual And Multimedia Systems, Infrastructure of audiovisual services—Coding of moving video, Recommendation ITU-T H.265, Feb. 2018, 692 pages.

(Continued)

*Primary Examiner* — Christopher Braniff
(74) *Attorney, Agent, or Firm* — McCarter & English LLP

(57) ABSTRACT

A method comprising obtaining a 360-degree video content from a video source; projecting the 360-degree video content onto a 2D image plane; dividing the projected 360-degree video content into a plurality of regions, wherein the regions are partly overlapping and each region covers a region of the 360-degree video content suitable for a viewport presentation; receiving a request for a viewport orientation of the 360-degree video content from a client; and providing the client with an viewport presentation of the region corresponding to the requested viewport orientation.

21 Claims, 9 Drawing Sheets

(56) References Cited

U.S. PATENT DOCUMENTS

| | | | |
|---|---|---|---|
| 2019/0102944 A1* | 4/2019 | Han | G06F 3/012 |
| 2019/0141311 A1 | 5/2019 | Lee et al. | |
| 2020/0021791 A1* | 1/2020 | Hur | H04N 21/6587 |
| 2020/0043133 A1 | 2/2020 | Boyce | |
| 2020/0204785 A1* | 6/2020 | Lee | G10L 19/008 |
| 2020/0242835 A1* | 7/2020 | Cherukuri | G06T 19/006 |
| 2020/0322403 A1 | 10/2020 | Dvir et al. | |
| 2021/0021806 A1 | 1/2021 | He et al. | |
| 2021/0092347 A1 | 3/2021 | Han et al. | |
| 2021/0400314 A1* | 12/2021 | Varekamp | H04N 21/21805 |
| 2022/0078396 A1 | 3/2022 | Gul et al. | |

FOREIGN PATENT DOCUMENTS

| | | |
|---|---|---|
| WO | 2019/120638 A1 | 6/2019 |
| WO | 2019/141901 A1 | 7/2019 |
| WO | 2020/201632 A1 | 10/2020 |
| WO | 2021/073940 A1 | 4/2021 |
| WO | 2021/105552 A1 | 6/2021 |
| WO | 2021/214379 A1 | 10/2021 |

OTHER PUBLICATIONS

"ITT4RT Permanent Document—Requirements, Working Assumptions and Potential Solutions", 3GPP TSG-SA4 Meeting #109e, S4-200738, Agenda: 0.7.0, Intel, May 20-Jun. 3, 2020, 44 pages.

"ITT4RT Permanent Document—Requirements, Working Assumptions and Potential Solutions", 3GPP TSG-SA4 Meeting #109e, S4-200840, Agenda: 0.7.1, Intel, May 20-Jun. 3, 2020, 47 pages.

Schulzrinne et al., "RTP: A Transport Protocol for Real-Time Applications", RFC 3550, Network Working Group, Jul. 2003, pp. 1-104.

Ott et al., "Extended RTP Profile for Real-time Transport Control Protocol (RTCP) Based Feedback (RTP/AVPF)", RFC 4585, Network Working Group, Jul. 2006, pp. 1-51.

Singer et al., "A General Mechanism for RTP Header Extensions", RFC 5285, Network Working Group, Jul. 2008, pp. 1-17.

Hannuksela et al., "An overview of the OMAF standard for 360° video", Data Compression Conference (DCC), Mar. 26-29, 2019, pp. 418-427.

"Potential Improvement of OMAF", Systems, ISO/IEC JTC1/SC 29/WG11, N19274, May 29, 2020, 328 pages.

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"Versatile supplemental enhancement information messages for coded video bitstreams", Series H: Audiovisual and Multimedia Systems Infrastructure of audiovisual services—Coding of moving video, Recommendation ITU-T H.274, Aug. 2020, 86 pages.

Wang et al., "RTP Payload Format for High Efficiency Video Coding (HEVC)", RFC 7798, Internet Engineering Task Force (IETF), Mar. 2016, pp. 1-86.

"3rd Generation Partnership Project; Technical Specification Group Services and System Aspects; IP Multimedia Subsystem (IMS); Multimedia Telephony; Media handling and interaction (Release 17)", 3GPP TS 26.114, V17.0.0, Apr. 2021, pp. 1-468.

Curcio et al., "360-Degree Video Streaming and its Subjective Quality", Annual Technical Conference and Exhibition, Oct. 23-26, 2017, 23 pages.

"Informational text on Viewport-dependent Processing in ITT4RT", 3GPP TSG SA WG 4 MTSI SWG Telco on ITT4RT, S4aM210659, Agenda: 4.1, Nokia Corporation, Jun. 30, 2021, pp. 1-10.

"Information Technology—Coding Of Audio-Visual Objects—Part 12: ISO Base Media File Format", ISO/IEC 14496-12, Fifth edition, Dec. 15, 2015, 248 pages.

"Information Technology—Coding Of Audio-Visual Objects—Part 14: MP4 File Format", ISO/IEC 14496-14, First edition, Nov. 15, 2003, 18 pages.

"Information Technology—Coding Of Audio-Visual Objects—Part 15: Advanced Video Coding (AVC) File Format", ISO/IEC 14496-15, First edition, Apr. 15, 2004, 29 pages.

International Search Report and Written Opinion received for corresponding Patent Cooperation Treaty Application No. PCT/EP2021/069683, dated Oct. 7, 2021, 18 pages.

Office action received for corresponding Finnish U.S. Appl. No. 20/215,820, dated Apr. 1, 2022, 11 pages.

Deshpande et al., "Text of ISO/IEC CD 23090-2 2nd edition OMAF", Systems, ISO/IEC JTC1/SC29/WG11 N18865-v1, Oct. 2019, 255 pages.

Non-Final Office action received for corresponding U.S. Appl. No. 17/376,345, dated Aug. 26, 2022, 15 pages.

Extended European Search Report received for corresponding European Patent Application No. 22185992.9, dated Jan. 3, 2023, 8 pages.

"ITT4RT Permanent Document—Requirements, Working Assumptions and Potential Solutions", 3GPP Hannuksel: WG4 Meeting #114e, S4-210933, Agenda: 15.2, Nokia Corporation, May 19-28, 2021, 85 pages.

* cited by examiner

METHOD, AN APPARATUS AND A COMPUTER PROGRAM PRODUCT FOR VIDEO CONFERENCING

TECHNICAL FIELD

The present solution generally relates to video conferencing.

BACKGROUND

3GPP MTSI specification TS 26.114 for ITT4RT defines a system for real-time 360-degree conference. A sender UE (ITT4RT-Tx client in terminal) provides a 360-degree video to a receiver UE (ITT4RT-Rx client in terminal) in a real-time conversational setting. A Media Resource Function (MRF) may be used, where the MRF receives 360-degree video from the sender UE and after processing delivers it to one or more receiver UEs. At any given time, only the region of the 360-degree video that is in the viewport of the receiver UE is visible. Therefore, the sender may use viewport-dependent delivery to minimize bandwidth waste. In viewport-dependent delivery, the content delivery may be adapted to the viewport orientation, thereby enabling higher quality in the viewport compared to the other part and facilitating low-latency delivery of the content.

In a case of a plurality of ITT4RT-Rx clients, scalability (in terms of number of ITT4RT-Rx clients) in viewport-dependent delivery can be achieved in different ways.

However, a change in viewport often requires a keyframe (such as an intra (I/IDR/IRAP) frame). If changes are frequent, the required number of keyframes would grow, consequently increasing the bandwidth requirement.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a method comprising: obtaining a 360-degree video content from a video source; projecting the 360-degree video content onto a 2D image plane; dividing the projected 360-degree video content into a plurality of regions, wherein the regions are partly overlapping and each region covers a region of the 360-degree video content suitable for at least one viewport presentation; receiving a request for a viewport orientation of the 360-degree video content from a client; and providing the client with a viewport presentation of the region corresponding to the requested viewport orientation.

An apparatus according to a second aspect comprises means for: obtaining a 360-degree video content from a video source; projecting the 360-degree video content onto a 2D image plane; dividing the projected 360-degree video content into a plurality of regions, wherein the regions are partly overlapping and each region covers a region of the 360-degree video content suitable for at least one viewport presentation; receiving a request for a viewport orientation of the 360-degree video content from a client device; and providing the client device with a viewport presentation of the region corresponding to the requested viewport orientation.

According to an embodiment, the apparatus comprises means for: carrying out session negotiations with a plurality of client devices for a viewport-dependent delivery of the 360-degree video content; and determining, based on a number of the client devices and/or parameters of the session negotiations, all regions to be encoded with a same resolution.

According to an embodiment, the apparatus comprises means for: obtaining information from said plurality of client devices about motion patterns of their users; and adjusting the division of the regions according to said information so as to minimize a need for region change.

According to an embodiment, the apparatus comprises means for encoding the regions have the same encoding bitrate.

According to an embodiment, the apparatus comprises means for determining more than one region to correspond to the viewport orientation requested by at least one client device.

According to an embodiment, the apparatus comprises means for dividing the projected 360-degree video content into a plurality of sets of regions, wherein regions in at least a first set of a plurality of regions have a larger field-of-view (FOV) and regions in at least a second set of a plurality of regions have a smaller FOV.

According to an embodiment, the apparatus comprises means for encoding only the regions corresponding to the viewport orientation requested by any client devices.

According to an embodiment, the apparatus comprises means for determining two polar regions for the 360-degree video content.

According to an embodiment, the apparatus comprises means for inserting key frames periodically into the encoded viewport presentation of the region provided to the client device.

According to an embodiment, the number of regions and their degree of overlap is fixed, and the apparatus comprises means for: redefining the regions as a sliding field-of-view (FOV) such that each region is slid an equal amount in the same direction when the regions are redefined.

According to an embodiment, the number of regions and their degree of overlap is changeable.

According to an embodiment, the apparatus comprises means for redefining the regions as a sliding field-of-view (FOV) such that sliding of one region does not directly influence the sliding of another region.

According to an embodiment, the apparatus comprises means for redefining the regions as a sliding field-of-view (FOV) such that sliding of one region influences the sliding of at least one other region with a different degree of overlap.

An apparatus according to a third aspect comprises at least one processor and at least one memory, said at least one memory stored with computer program code thereon, the at least one memory and the computer program code configured to, with the at least one processor, cause the apparatus at least to perform: obtain a 360-degree video content from a video source; project the 360-degree video content onto a 2D image plane; divide the projected 360-degree video content into a plurality of regions, wherein the regions are partly overlapping and each region covers a region of the 360-degree video content suitable for at least one viewport presentation; receive a request for a viewport orientation of the 360-degree video content from a client; and provide the client with a viewport presentation of the region corresponding to the requested viewport orientation.

DESCRIPTION OF THE DRAWINGS

In the following, various embodiments will be described in more detail with reference to the appended drawings, in which.

DESCRIPTION OF EXAMPLE EMBODIMENTS

Figure 1:
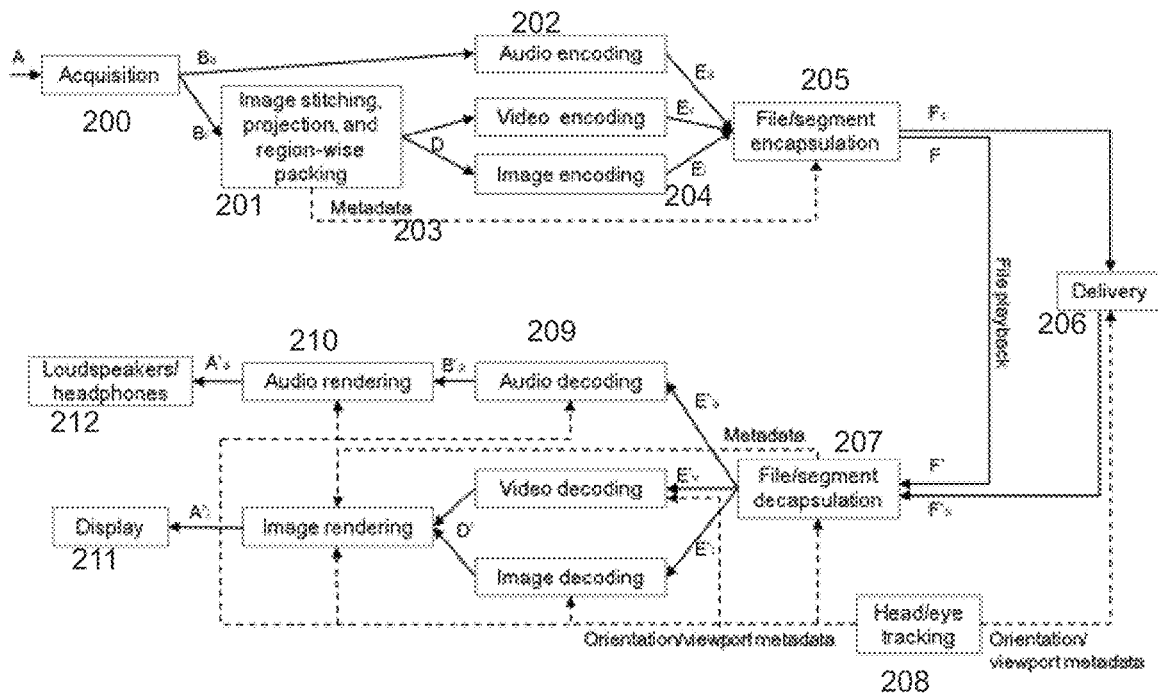
FIG. 1 shows an example of an OMAF end-to-end system.

In the following, several embodiments of the disclosure will be described in the context of one videoconferencing arrangement. It is to be noted that different embodiments may have applications widely in any environment where improvement of virtual videoconferencing is desired.

In the following, term "omnidirectional" may refer to media content that may have greater spatial extent than a field-of-view of a device rendering the content. Omnidirectional content may, for example, cover substantially 360 degrees in the horizontal dimension and substantially 180 degrees in the vertical dimension, but omnidirectional may also refer to content covering less than 360-degree view in the horizontal direction and/or 180 degree view in the vertical direction.

Immersive multimedia, such as omnidirectional content consumption is more complex for the end user compared to the consumption of 2D content. This is due to the higher degree of freedom available to the end user. The freedom also results in more uncertainty. The MPEG Omnidirectional Media Format (OMAF) v1 standardized the omnidirectional streaming of single 3DoF (3 Degrees of Freedom) content (where the viewer is located at the centre of a unit sphere and has three degrees of freedom (Yaw-Pitch-Roll). OMAF includes means to optimize the Viewport Dependent Streaming (VDS) operations and bandwidth management.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (VHFoV) and a vertical field-of-view (VVFoV).

The 360-degree space may be divided into a discrete set of viewports, each separated by a given distance (e.g., expressed in degrees), so that the omnidirectional space can be imagined as a map of overlapping viewports, and the viewport is switched discretely as the user changes his/her orientation while watching content with a head-mounted display (HMD). When the overlapping between viewports is reduced to zero, the viewports can be imagined as adjacent non-overlapping tiles within the 360-degrees space. The H.265 video codec implements the concept of tiles which may be used to realize this scenario (both overlapping and not).

When streaming VR video, a subset of 360-degree video content covering the viewport (i.e., the current view orientation) may be transmitted at the best quality/resolution, while the remaining of 360-degree video may be transmitted at a lower quality/resolution or not transmitted at all. This is what characterizes a VDS system, as opposed to a Viewport Independent Streaming system, where the omnidirectional video is streamed at high quality in all directions.

FIG. 1 illustrates the Omnidirectional Media Format (OMAF) system architecture. The system can be situated in a video camera, or in a network server, for example. As shown in FIG. 1, an omnidirectional media (A) is acquired. If the OMAF system is part of the video source, the omnidirectional media (A) is acquired from the camera means. If the OMAF system is in a network server, the omnidirectional media (A) is acquired from a video source over network.

The omnidirectional media comprises image data (Bi) and audio data (Ba), which are processed separately. In image stitching, rotation, projection and region-wise packing, the images/video of the source media and provided as input (Bi) are stitched to generate a sphere picture on a unit sphere per the global coordinate axes. The unit sphere is then rotated relative to the global coordinate axes. The amount of rotation to convert from the local coordinate axes to the global coordinate axes may be specified by the rotation angles indicated in a RotationBox. The local coordinate axes of the unit sphere are the axes of the coordinate system that has been rotated. The absence of the RotationBox indicates that the local coordinate axes are the same as the global coordinate axes. Then, the spherical picture on the rotated unit sphere is converted to a two-dimensional projected picture, for example using the equirectangular projection. When spatial packing of stereoscopic content is applied, two spherical pictures for the two views are converted to two constituent pictures, after which frame packing is applied to pack the two constituent pictures on one projected picture. Rectangular region-wise packing can then be applied to obtain a packed picture from the projected picture. The packed pictures (D) are then provided for video and image encoding to result in encoded image (Ei) and/or encoded video stream (Ev). The audio of the source media is provided as input (Ba) to audio encoding that provides as an encoded audio (Ea). The encoded data (Ei, Ev, Ea) are then encapsulated into file for playback (F) and delivery (i.e. streaming) (Fs).

A real-world audio-visual scene (A) may be captured 200 by audio sensors as well as a set of cameras or a camera device with multiple lenses and sensors. The acquisition results in a set of digital image/video (Bi) and audio (Ba) signals. The cameras/lenses may cover all directions around the center point of the camera set or camera device, thus the name of 360-degree video.

Audio can be captured using many different microphone configurations and stored as several different content formats, including channel-based signals, static or dynamic (i.e. moving through the 3D scene) object signals, and scene-based signals (e.g., Higher Order Ambisonics). The channel-based signals may conform to one of the loudspeaker layouts defined in CICP (Coding-Independent Code-Points). In an omnidirectional media application, the loudspeaker layout signals of the rendered immersive audio program may be binauralized for presentation via headphones.

The images (Bi) of the same time instance are stitched, projected, and mapped 201 onto a packed picture (D).

For monoscopic 360-degree video, the input images of one time instance may be stitched to generate a projected picture representing one view. An example of image stitching, projection, and region-wise packing process for monoscopic content is illustrated with FIG. 2*a*. Input images (Bi) are stitched and projected onto a three-dimensional projection structure that may for example be a unit sphere. The projection structure may be considered to comprise one or more surfaces, such as plane(s) or part(s) thereof. A projection structure may be defined as three-dimensional structure consisting of one or more surface(s) on which the captured VR image/video content is projected, and from which a respective projected picture can be formed. The image data on the projection structure is further arranged onto a two-dimensional projected picture (C). The term projection may be defined as a process by which a set of input images are projected onto a projected picture. There may be a pre-defined set of representation formats of the projected picture, including for example an equirectangular projection (ERP) format and a cube map projection (CMP) format. It may be considered that the projected picture covers the entire sphere.

Optionally, a region-wise packing is then applied to map the projected picture (C) onto a packed picture (D). If the region-wise packing is not applied, the packed picture is identical to the projected picture, and this picture is given as input to image/video encoding. Otherwise, regions of the projected picture (C) are mapped onto a packed picture (D) by indicating the location, shape, and size of each region in the packed picture, and the packed picture (D) is given as input to image/video encoding. The term region-wise packing may be defined as a process by which a projected picture is mapped to a packed picture. The term packed picture may be defined as a picture that results from region-wise packing of a projected picture.

Figure 2A:
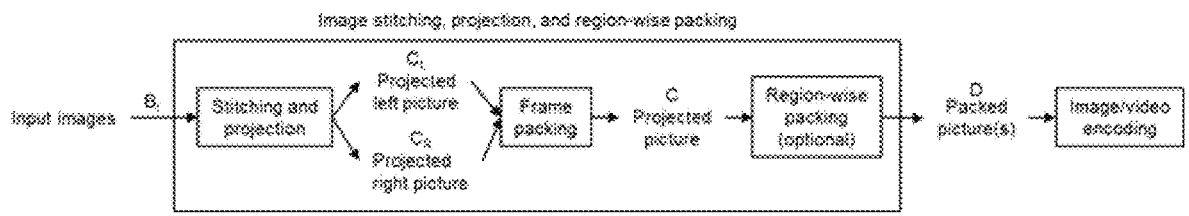
FIG. 2a shows an example of image stitching, projection and region-wise packing.

In the case of stereoscopic 360-degree video, as shown in an example of FIG. 2*a*, the input images of one time instance are stitched to generate a projected picture representing two views (CL, CR), one for each eye. Both views (CL, CR) can be mapped onto the same packed picture (D) and encoded by a traditional 2D video encoder. Alternatively, each view of the projected picture can be mapped to its own packed picture, in which case the image stitching, projection, and region-wise packing is performed as illustrated in FIG. 2*a*. A sequence of packed pictures of either the left view or the right view can be independently coded or, when using a multiview video encoder, predicted from the other view.

An example of image stitching, projection, and region-wise packing process for stereoscopic content where both views are mapped onto the same packed picture, as shown in FIG. 1 is described next in more detailed manner. Input images (Bi) are stitched and projected onto two three-dimensional projection structures, one for each eye. The image data on each projection structure is further arranged onto a two-dimensional projected picture (CL for left eye, CR for right eye), which covers the entire sphere. Frame packing is applied to pack the left view picture and right view picture onto the same projected picture. Optionally, region-wise packing is then applied to the pack projected picture onto a packed picture, and the packed picture (D) is given as input to image/video encoding. If the region-wise packing is not applied, the packed picture is identical to the projected picture, and this picture is given as input to image/video encoding.

The image stitching, projection, and region-wise packing process can be carried out multiple times for the same source images to create different versions of the same content, e.g. for different orientations of the projection structure. Similarly, the region-wise packing process can be performed multiple times from the same projected picture to create more than one sequence of packed pictures to be encoded.

360-degree panoramic content (i.e., images and video) cover horizontally (up to) the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases panoramic content may have less than 360-degree horizontal field-of-view and up to 180-degree vertical field-of-view, while otherwise have the characteristics of equirectangular projection format.

Figure 2B:
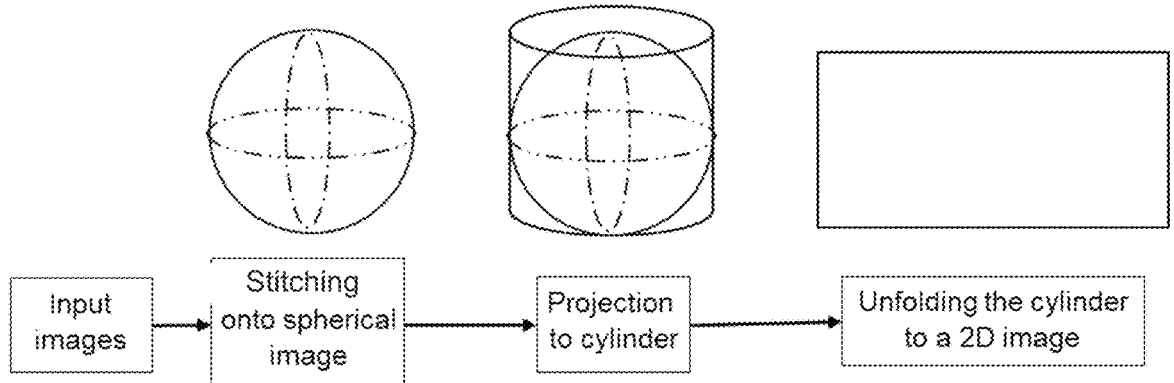
FIG. 2b shows an example of a process of forming a monoscopic equirectangular panorama picture.

An example of the process of forming a monoscopic equirectangular panorama picture is illustrated in FIG. 2*b*. A set of input images, such as fisheye images of a camera array or a camera device with multiple lenses and sensors, is stitched onto a spherical image. The spherical image is further projected onto a cylinder (without the top and bottom faces). The cylinder is unfolded to form a two-dimensional projected picture. In practice one or more of the presented steps may be merged; for example, the input images may be directly projected onto a cylinder without an intermediate projection onto a sphere. The projection structure for equirectangular panorama may be considered to be a cylinder that comprises a single surface.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

In some cases, panoramic content with 360-degree horizontal field-of-view but with less than 180-degree vertical field-of-view may be considered special cases of equirectangular projection, where the polar areas of the sphere have not been mapped onto the two-dimensional image plane. In some cases, a panoramic image may have less than 360-degree horizontal field-of-view and up to 180-degree vertical field-of-view, while otherwise has the characteristics of equirectangular projection format.

In 360-degree systems, a coordinate system may be defined through orthogonal coordinate axes, such as X (lateral), Y (vertical, pointing upwards), and Z (back-to-front axis, pointing outwards). Rotations around the axes may be defined and may be referred to as yaw, pitch, and roll. Yaw may be defined to rotate around the Y axis, pitch around the X axis, and roll around the Z axis. Rotations may be defined to be extrinsic, i.e., around the X, Y, and Z fixed reference axes. The angles may be defined to increase clockwise when looking from the origin towards the positive end of an axis. The coordinate system specified can be used for defining the sphere coordinates, which may be referred to as azimuth ($\phi$) and elevation ($\theta$).

Referring again to FIG. 1, the OMAF allows the omission of image stitching, projection, and region-wise packing and encode the image/video data in their captured format. In this case, images (D) are considered the same as images (Bi) and a limited number of fisheye images per time instance are encoded.

For audio, the stitching process is not needed, since the captured signals are inherently immersive and omnidirectional.

The stitched images (D) are encoded 204 as coded images (Ei) or a coded video bitstream (Ev). The captured audio (Ba) is encoded 202 as an audio bitstream (Ea). The coded images, video, and/or audio are then composed 205 into a media file for file playback (F) or a sequence of an initialization segment and media segments for streaming (Fs), according to a particular media container file format. In this specification, the media container file format is the ISO base media file format. The file encapsulator 205 also includes metadata into the file or the segments, such as projection and region-wise packing information assisting in rendering the decoded packed pictures.

The metadata in the file may include:
the projection format of the projected picture,
fisheye video parameters,
the area of the spherical surface covered by the packed picture,
the orientation of the projection structure corresponding to the projected picture relative to the global coordinate axes,
region-wise packing information, and
region-wise quality ranking (optional).

Region-wise packing information may be encoded as metadata in or along the bitstream, for example as region-wise packing SEI message(s) and/or as region-wise packing boxes in a file containing the bitstream. For example, the packing information may comprise a region-wise mapping from a pre-defined or indicated source format to the packed picture format, e.g. from a projected picture to a packed picture, as described earlier. The region-wise mapping information may for example comprise for each mapped region a source rectangle (a.k.a. projected region) in the projected picture and a destination rectangle (a.k.a. packed region) in the packed picture, where samples within the source rectangle are mapped to the destination rectangle and rectangles may for example be indicated by the locations of the top-left corner and the bottom-right corner. The mapping may comprise resampling. Additionally or alternatively, the packing information may comprise one or more of the following: the orientation of the three-dimensional projection structure relative to a coordinate system, indication which projection format is used, region-wise quality ranking indicating the picture quality ranking between regions and/or first and second spatial region sequences, one or more transformation operations, such as rotation by 90, 180, or 270 degrees, horizontal mirroring, and vertical mirroring. The semantics of packing information may be specified in a manner that they are indicative for each sample location within packed regions of a decoded picture which is the respective spherical coordinate location.

The segments (Fs) may be delivered 206 using a delivery mechanism to a player.

The file that the file encapsulator outputs (F) is identical to the file that the file decapsulator inputs (F'). A file decapsulator 207 processes the file (F') or the received segments (F's) and extracts the coded bitstreams (E'a, E'v, and/or E'i) and parses the metadata. The audio, video, and/or images are then decoded 208 into decoded signals (B'a for audio, and D' for images/video). The decoded packed pictures (D') are projected 210 onto the screen of a head-mounted display or any other display device 211 based on the current viewing orientation or viewport and the projection, spherical coverage, projection structure orientation, and region-wise packing metadata parsed from the file. Likewise, decoded audio (B'a) is rendered 210, e.g. through headphones 212, according to the current viewing orientation. The current viewing orientation is determined by the head tracking and possibly also eye tracking functionality 208. Besides being used by the renderer 210 to render the appropriate part of decoded video and audio signals, the current viewing orientation may also be used the video and audio decoders 209 for decoding optimization.

The process described above is applicable to both live and on-demand use cases.

At any point of time, a video rendered by an application on a HMD or on another display device renders a portion of the 360-degree video. This portion may be defined as a viewport. A viewport may be understood as a window on the 360-degree world represented in the omnidirectional video displayed via a rendering display.

According to another definition, a viewport may be defined as a part of the spherical video that is currently displayed. A viewport may be characterized by horizontal and vertical field-of-views (FOV or FoV).

A viewport may further be defined as a region of omnidirectional image or video suitable for display and viewing by the user. A current viewport (which may be sometimes referred simply as a viewport) may be defined as the part of the spherical video that is currently displayed and hence is viewable by the user(s) i.e. the point or space from which the user views the scene; it usually corresponds to a camera position. Slight head motion may not imply a different viewpoint. A viewing position may be defined as the position within a viewing space from which the user views the scene. A viewing space may be defined as a 3D space of viewing positions within which rendering of image and video is enabled and VR experience is valid.

An overlay may be defined as a video clip, an image or text that is superimposed on top of a background, which may be referred to as background visual media and may be e.g. an omnidirectional video or image.

The appearance of overlays can be controlled flexibly in OMAF. Moreover, the overlay structures are extensible and new controls or properties can be specified in future versions or amendments of the OMAF standard. Background visual media may be defined in OMAF as the omnidirectional video or image that is rendered on the unit sphere, and the term overlay source may refer to the visual content displayed as an overlay.

In OMAF, the content author can specify separately per each overlay which types of user interactions are enabled. The following user interaction types can be enabled or disabled in an OMAF file: changing the position, modifying the distance from the center of the unit sphere, switching the overlay on or off, tuning the opacity, resizing, rotating, cropping, and switching the overlay source to another one. A textual label can be given for each overlay and utilized by a user interface to enable end-users to switch overlays on or off. Another way is to provide an associated sphere region that the user can select to turn an overlay on or off.

In OMAF, an overlay source can be a video track or an image item, in which case the overlay consists of the entire decoded picture. Since some player devices might not be capable of running several video decoder instances simultaneously, it is also possible to pack overlays spatially with the background visual media. In that case, an overlay source is specified as a rectangle within the decoded picture area. Furthermore, it is possible to indicate that an overlay source is defined by the recommended viewport timed metadata track. In yet another alternative, an overlay source is provided by external means, such as through a URL. The externally specified overlay source could be used to show content from a separate application within an OMAF presentation.

In OMAF, the content author has two mechanisms to enable scaling the player-side complexity of overlay rendering. First, each overlay can be given a priority for rendering. The highest priority value means that the overlay must be rendered. Second, it is indicated whether a control or property associated with an overlay is essential or optional. For example, it can be indicated that overlay composition with an alpha plane is optional. In this case, if the player does not have enough resources to carry out the processing required for alpha planes, it is allowed to render an opaque overlay.

In OMAF, the controls and properties for overlays can be static, i.e. remain constant for the entire duration of the overlay, or dynamic, i.e. signaled by a timed metadata track where the controls and properties are dynamically adjusted. For example, it is possible to move or resize an overlay as a function of time.

OMAF also defines an OMAF overlay information (OVLY) DASH descriptor at Adaptation Set level. The OVLY descriptor specifies overlays in DASH Representations associated with the descriptor. The OVLY descriptor allows distinguishing directly from the MPD file, between Adaptation Sets that contain overlays from the Adaptation Sets that contain background visual media.

The phrase along the bitstream (e.g. indicating along the bitstream) may be defined to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream. For example, an indication along the bitstream may refer to metadata in a container file that encapsulates the bitstream.

Available media file format standards include International Standards Organization (ISO) Base Media File Format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15) and High Efficiency Video Coding standard (HEVC or H.265/HEVC).

Some concepts, structures, and specifications of ISOBMFF are described below as an example of a container file format, based on which the embodiments may be implemented. The aspects of the invention are not limited to ISOBMFF, but rather the description is given for one possible basis on top of which the embodiments of the disclosure may be partly or fully realized. The embodiments of the present disclosure may also be implemented using other transport protocols, such as the Real-Time Transport Protocol (RTP) as described below. In general, the information transmitted to implement this invention can be transmitted using any protocol and any layers of the ISO (International Standardization Organization) OSI (Open Systems Interconnection) protocol stack.

A transmission channel or a communication channel or a channel may refer to either a physical transmission medium, such as a wire, or to a logical connection over a multiplexed medium.

Real-time transfer protocol (RTP) is widely used for real-time transport of timed media such as audio and video. RTP may operate on top of the User Datagram Protocol (UDP), which in turn may operate on top of the Internet Protocol (IP). In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver device may group packets by synchronization source for playback. Examples of synchronization sources include the sender of a stream of packets derived from a signal source such as a microphone or a camera, or an RTP mixer. Each RTP stream is identified by a SSRC that is unique within the RTP session.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

3GPP has standardized Multimedia Telephony Service for IMS (MTSI), and a terminal according to MTSI, i.e. a MTSI terminal, may support the Immersive Teleconferencing and Telepresence for Remote Terminals (ITT4RT) feature, which is currently being standardized. MTSI clients supporting the ITT4RT feature may be referred to as ITT4RT clients.

ITT4RT functionality for MTSI enables support of an immersive experience for remote terminals joining teleconferencing and telepresence sessions. It addresses scenarios with two-way audio and one-way immersive 360-degree video, e.g., a remote single user wearing an HMD participating in a conference will send audio and optionally 2D video (e.g., of a presentation, screen sharing and/or a capture of the user itself), but receives stereo or immersive voice/audio and immersive 360-degree video captured by an omnidirectional camera in a conference room connected to a fixed network.

Since immersive 360-degree video support for ITT4RT is unidirectional, ITT4RT clients supporting immersive 360-degree video are further classified into two types to distinguish between the capabilities for sending or receiving immersive video: (i) ITT4RT-Tx client, which is an ITT4RT client capable of sending immersive 360-degree video, and (ii) ITT4RT-Rx client, which is an ITT4RT client capable of receiving immersive 360-degree video.

3GPP MTSI specification TS 26.114 for ITT4RT defines a system for real-time 360-degree conference. A sender UE (ITT4RT-Tx client in terminal) provides a 360-degree video to a receiver UE (ITT4RT-Rx client in terminal) in a real-time conversational setting. A Media Resource Function (MRF) may be used, where the MRF receives 360-degree video from the sender UE and after processing delivers it to one or more receiver UEs. At any given time, only the region of the 360-degree video that is in the viewport of the receiver UE is visible. Therefore, the sender may use viewport-dependent delivery to minimize bandwidth waste. In viewport-dependent delivery, the content delivery may be adapted to the viewport orientation, thereby enabling higher quality in the viewport compared to the other part and facilitating low-latency delivery of the content.

The receiver UE sends viewport information to the sender UE (or the MRF) using RTCP viewport feedback. The ITT4RT-Tx client uses viewport-dependent processing to provide a higher quality in the viewport region than the region outside of the viewport (background). When the MRF is used, the MRF may receive viewport-independent 360-degree video from the sender UE and delivers viewport-dependent video to the receiver UE. In some cases, a viewport margin may be extended around the viewport region, such that the margin is provided at the same quality as the viewport or at a quality lower than the viewport but higher than the background. The viewport margin ensures that there is a consistency in the quality of the image during small head motion (viewport change), enhancing the experience. For maximum bandwidth savings, the background region is not delivered at all.

One way to provide viewport-dependent delivery is through the use of sphere-locked (SL) high-quality (HQ) region encoding. Therein, a projected picture is rotated such that the center of the desired viewport is at the center of the sphere. The projected picture is then cropped to remove background area. A viewport margin is recommended to allow for small head movement. The cropped picture is then encoded and sent to the ITT4RT-Rx client along with rotation information (e.g. using the rotation SEI message). The ITT4RT-Rx client reverse the rotation prior to rendering the received video stream.

In a case of a plurality of ITT4RT-Rx clients, scalability (in terms of number of ITT4RT-Rx clients) in viewport-dependent delivery can be achieved in different ways. Sphere-locked HQ region encoding is bandwidth efficient, maintains a constant image size and properties for the delivered video but is not inherently scalable to server large number of receivers which require different viewport orientations. It can be made scalable using predefined regions that are pre-encoded and the appropriate ones are delivered to the ITT4RT-Rx client depending on the current viewport.

However, a change in region often requires a keyframe (such as an intra (I/IDR/IRAP) frame). If changes are frequent, the required number of keyframes would grow, consequently increasing the bandwidth requirement.

Accordingly, there is a need for method to perform scalable viewport-dependent processing (VDP) for real-time immersive video that also provides control on limiting the number of keyframes and unnecessary or frequent region switching. Furthermore, for a fixed number of encoders, a much greater number of receivers can be served.

Now an improved method for scalable viewport-dependent processing is introduced in order to at least alleviate the above problems.

Figure 3:
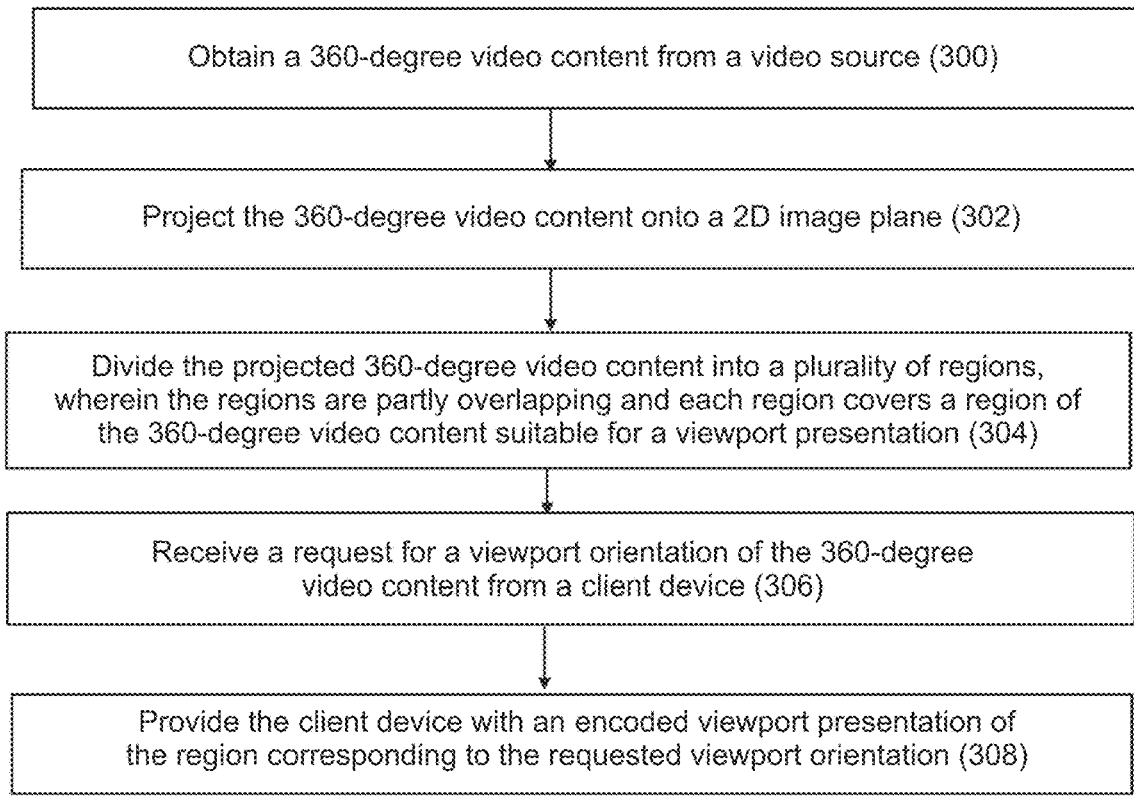
FIG. 3 shows a flow chart of a method for scalable viewport-dependent processing according to an aspect.

The method according to an aspect, as shown in FIG. 3, comprises obtaining (300) a 360-degree video content from a video source; projecting (302) the 360-degree video content onto a 2D image plane; dividing (304) the projected 360-degree video content into a plurality of regions, wherein the regions are partly overlapping and each region covers a region of the 360-degree video content suitable for at least one viewport presentation; receiving (306) a request for a viewport orientation of the 360-degree video content from a client device; and providing (308) the client device with a viewport presentation of the region corresponding to the requested viewport orientation.

Thus, a scalable method for delivering viewport-dependent immersive video to any number of receivers is provided herein. The method can be implemented, for example, in a media server or in an apparatus comprising a Media Resource Function (MRF) or any corresponding video conferencing function. In order to make the method scalable, a set of overlapping regions (regions can be in the 3D sphere domain or 2D ERP domain) are defined over the full 360-degree video such that only one of these regions is required for any viewport orientation. Upon receiving a request for a viewport orientation of the 360-degree video content from a client device, the region covering the requested viewport orientation is delivered, for example as encoded, to the client device as viewport-dependent delivery.

It is noted that in the encoding of the regions, the sphere-locked HQ viewport for VDP may be applied. Thus, the projected 360-degree video content is rotated such that the center of the region is at the center of the sphere, and from each region, the background area is removed. A viewport margin may be applied for the region before the background region is removed.

According to an embodiment, the method comprises carrying out session negotiations with a plurality of client devices for a viewport-dependent delivery of the 360-degree video content; and determining, based on a number of the client devices and/or parameters of the session negotiations, all regions to be encoded with a same resolution.

Thus, one or more receivers (client devices) negotiate, with the videoconferencing function such as the MRF, a media channel for viewport-dependent delivery of the 360-degree video. The MRF, considering the viewport sizes and/or the number of the receivers, defines a set of overlapping regions on the projected picture. All regions may have equal resolution, thereby ensuring that the image properties do not change for the video stream due to changes in viewport, if session parameters do not allow for such changes without session re-negotiation.

According to an embodiment, the method comprises obtaining information from said plurality of client devices about motion patterns of their users; and adjusting the division of the regions according to said information so as to minimize a need for region change.

A receiver may switch from one region to another in response to a viewport change. When this happens, the sender (i.e. the apparatus comprising the videoconferencing function such as the MRF) may be required to insert a keyframe (e.g. I-frames) for the new region. In order to minimize the need for these I-frames, a sender may obtain information about the live statistics of the motion patterns of the players and redefine the regions dynamically based on this information, i.e., the encoded regions are dynamically changed to minimize the encoding requirements of the sender and frequency of receivers switching between different encoded regions.

Figure 4:
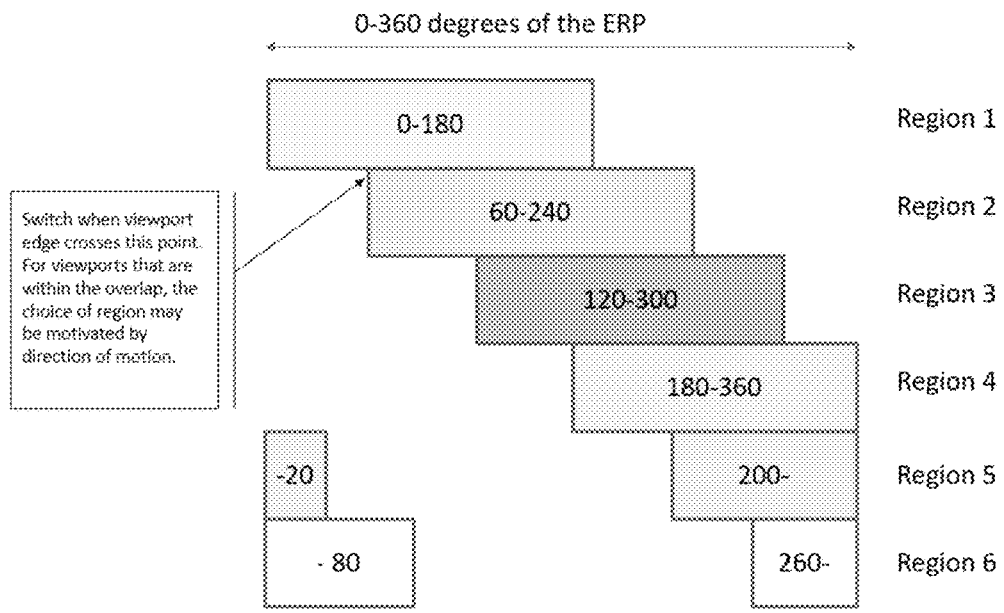
FIG. 4 shows an example of overlapping regions with constant size according to an embodiment.

FIG. 4 shows an example of overlapping regions with constant size. Six regions are shown, each covering 180 degrees horizontally from the 360-degree equirectangular panorama projection. There is a 60-degree step between adjacent regions such that there is a 120-degree overlap between the adjacent regions. The regions may have the same resolution, which may be the resolution negotiated with the receivers during session establishment. Keeping the same resolution avoids the need for any renegotiations or signalling with the video. The regions are defined such that for any possible viewport orientation of any of the viewports of the receivers, only one region is required.

A switch between the regions may take place when a viewport edge crosses the 60-degree step between adjacent regions. When the viewport of a receiver is fully covered by more than one of the overlapping regions, the choice of region may be motivated by the content, the direction of motion, past head motion trends or point of interest (e.g., dominant speaker) etc. According to an embodiment, the regions have the same encoding bit rate such that bit rate requirements do not change with a change in region.

Figure 5A:
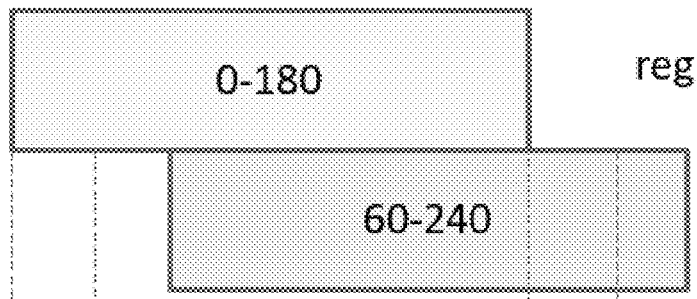
FIGS. 5a-5c illustrate an example of re-defining and/or adjusting the regions according to an embodiment.
Figure 5B:
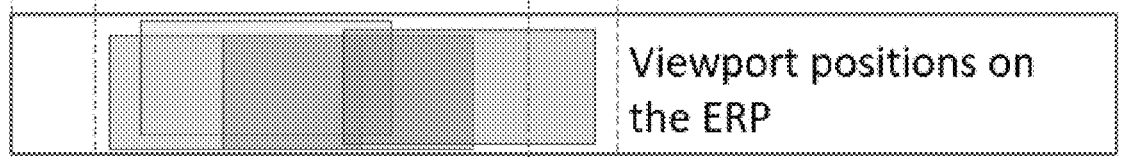
Figure 5C:
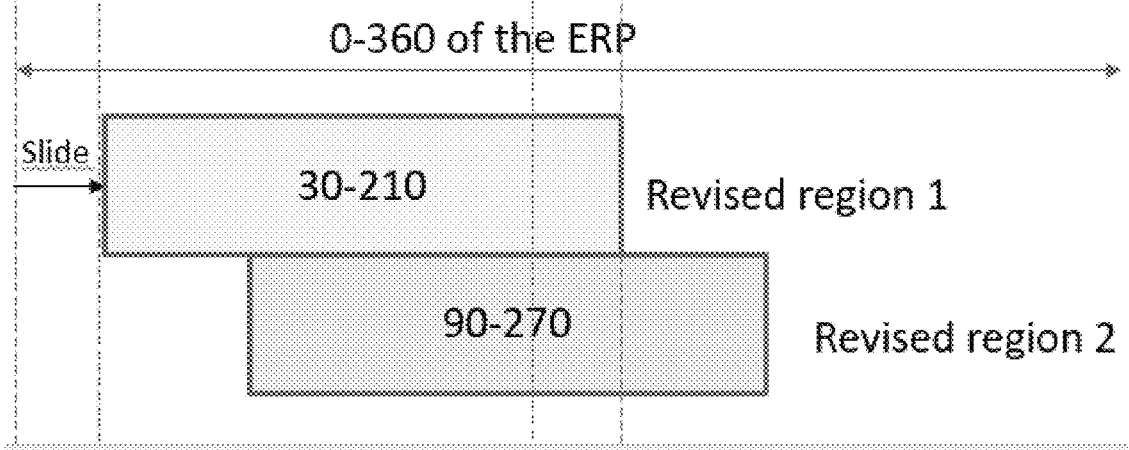

FIGS. 5a-5c illustrate an example of re-defining and/or adjusting the regions. Depending on the positions and movements of the viewports, the regions may be redefined to prevent switching from one region to another, thereby reducing the frequency of region switching as well as lowering the encoding requirements by converging more receivers to a single region. FIGS. 5a and 5b illustrates this with an example of two regions: region 1 and region 2, as shown in FIG. 5a. FIG. 5b shows the position of the viewports of four receivers, which are all at the overlapping boundaries of the two regions. FIG. 5c shows the regions adjusted by 30 degrees such that all viewports lie in the revised region 1. Following this, information about the revised regions needs to be signalled to the receivers together with the video, at least once. The new information about the revised region may be sent in or along the video bitstream (including out-of-band transmission using a reliable channel). The format for a region may contain at least left, right, upper, and lower bounds (percentage or angles) to the resolution of the 360-degree video.

According to an embodiment, the method comprises determining more than one region to correspond to the viewport orientation requested by said at least one client. Hence, more than one region is defined for any single viewport orientation such that the resolution of the delivered image is still maintained.

According to an embodiment, the FOV of the regions may be different but the resolution is kept constant, e.g., a smaller FOV is used for regions that have higher details in terms of content whereas a larger FOV is used for low-detail content (e.g. the sky or ocean) where a lower resolution and consequently lower quality is not noticeable.

Figure 6:
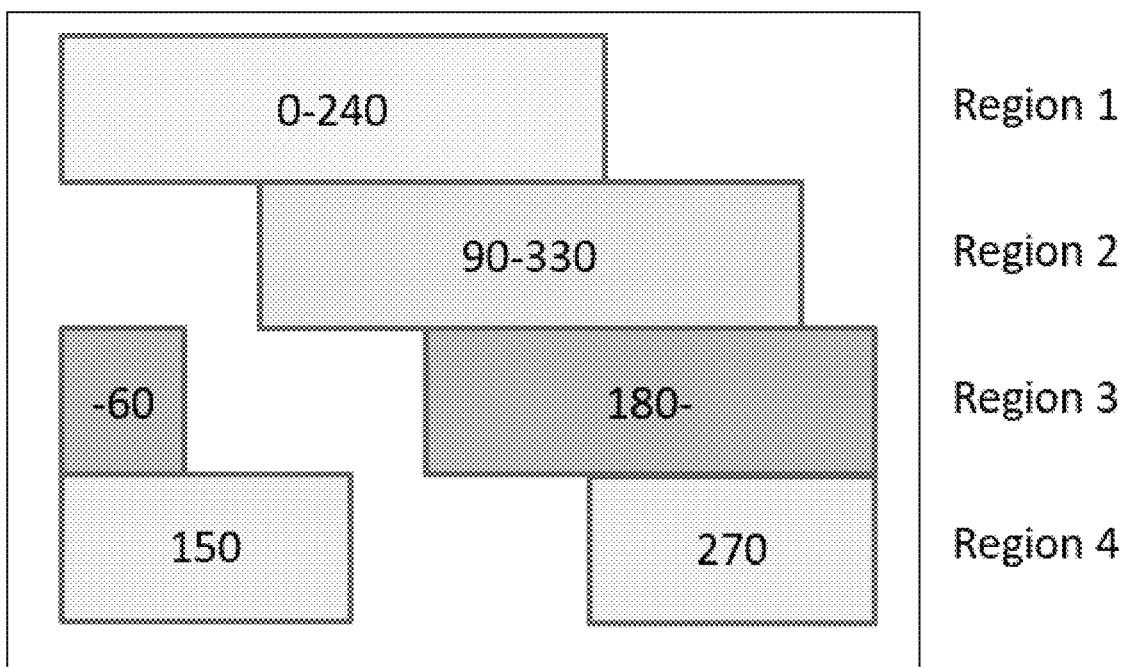
FIG. 6 shows an example of a larger FOV region according to an embodiment.

According to an embodiment, the method comprises dividing the projected 360-degree video content into a plurality of sets of regions, wherein regions in at least a first set of a plurality of regions have a larger field-of-view (FOV) and regions in at least a second set of a plurality of regions have a smaller FOV. Thus, at least two sets of regions may be available, one with larger FOV and one with smaller FOV. FIG. 6 shows an example of a larger FOV in comparison to the FOV of FIG. 4. In FIG. 6, four regions are shown, each covering 240 degrees horizontally from the 360-degree equirectangular panorama projection. There is a 90-degree step between adjacent regions such that there is a 150-degree overlap between the adjacent regions.

The regions with different FOVs may be utilised, for example, in a situation where a receiver is experiencing high levels of motion-to-high-quality latency, whereupon it may be switched to a region with larger FOV to improve user experience. In an embodiment, the required bit rate for both the region of a small FOV and the region of a large FOV is the same.

According to an embodiment, the regions may be revised or a switch between the region of a small FOV and the region of a large FOV is based on one or more of the following characteristics:
Content of the 360-degree video
Spatial characteristics of audio
Past head motion traces
Type of use case, such as VR conference call, VR tourism, sports live stream
Type and number of viewports and receiver devices
The available encoders Another aspect relates to an apparatus configured to carry out the scalable viewport-dependent processing. Such an apparatus may comprise means for obtaining a 360-degree video content from a video source; means for projecting the 360-degree video content onto a 2D image plane; means for dividing the projected 360-degree video content into a plurality of regions, wherein the regions are partly overlapping and each region covers a region of the 360-degree video content suitable for at least one viewport presentation; means for receiving a request for a viewport orientation of the 360-degree video content from a client device; and means for providing the client device with a viewport presentation of the region corresponding to the requested viewport orientation.

Figure 7:
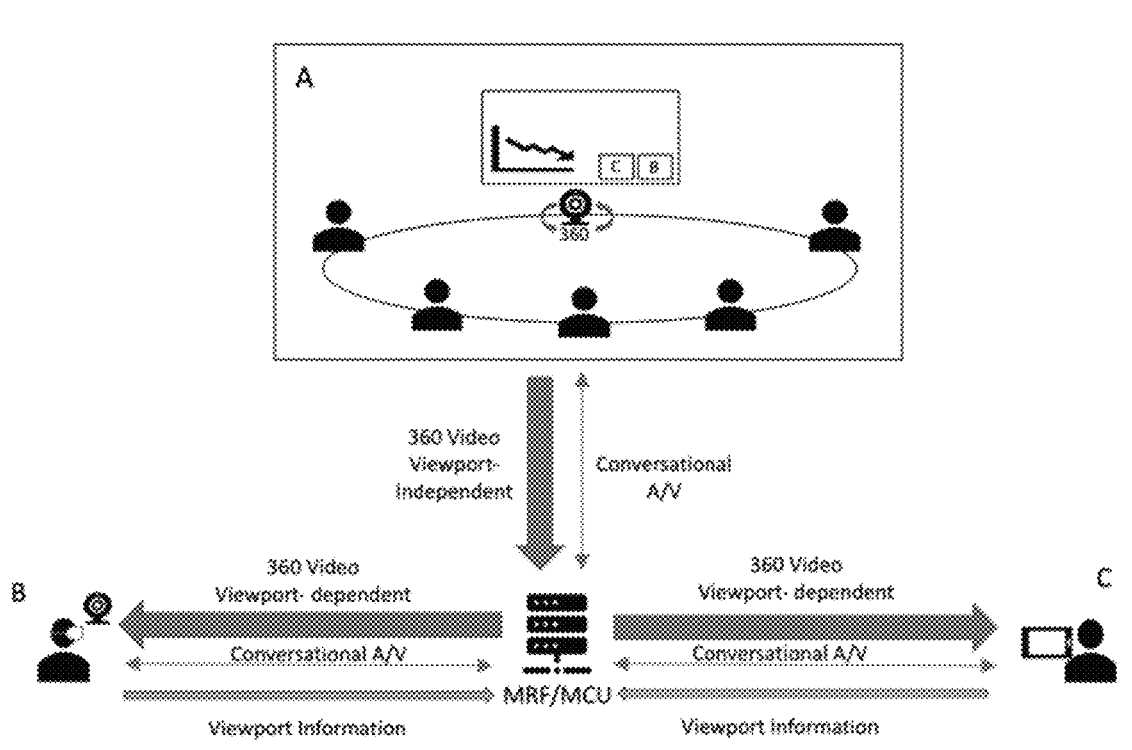
FIG. 7 shows an exemplified setup for teleconference according to an embodiment.

Such an apparatus may be, for example, a media server or an apparatus comprising a Media Resource Function (MRF) that receives a 360-degree video from a video source. FIG. 7 illustrates the use case for ITT4RT. It is noted that ITT4RT is described only as an example here and there may be other solutions for real-time delivery of 360-degree video. One or more receivers are connected to the MRF and have negotiated a media channel to receiver viewport-dependent delivery of the said 360-degree video. The MRF, considering the viewport. When the MRF receives a request for a viewport orientation of the 360-degree video content from a receiver, the MRF provides the region covering the requested viewport orientation to the receiver as viewport-dependent delivery.

According to an embodiment, the method comprises encoding only the regions corresponding to the viewport orientation requested by any client devices. Thus, each region may be encoded and served to receivers by a subprocess or thread, and only the regions that have active receivers are encoded at any given time. The maximum encoding requirements may be limited by the total number of defined regions.

Figure 8:
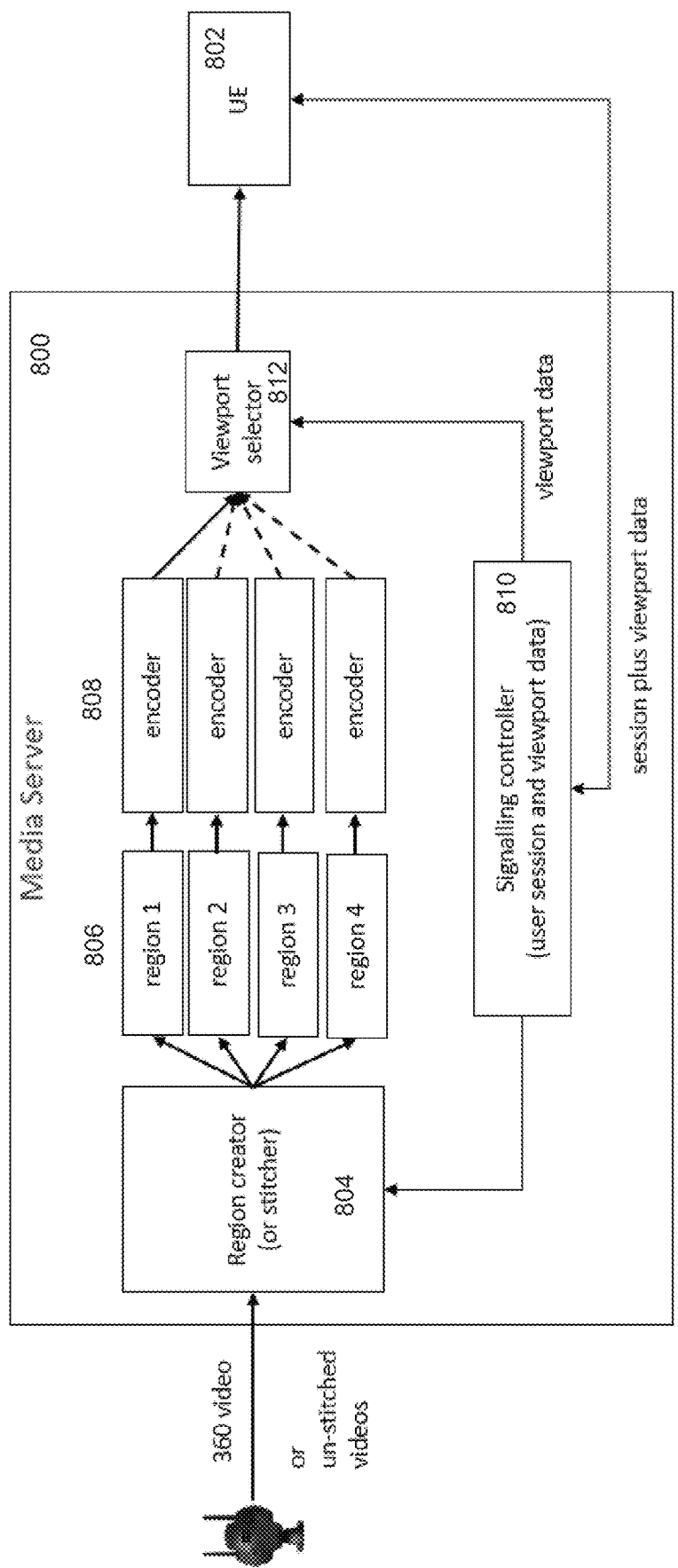
FIG. 8 shows an implementation example of a media server according to an embodiment.

FIG. 8 shows an implementation example of a media server with 4 regions. FIG. 8 shows a media server 800 and one or more receiver UEs 802 connected to the media server with negotiated media channel configurations. Based on the received 360-degree video content, a region creator 804 creates a set of four regions 806. For each region, an encoder thread/process 808 is assigned to be activated, when needed. A signalling controller 810 controls the session negotiation and viewport data parameters between the media server and the receiver UEs. A viewport selector 812 is initialized for each receiver UE that selects the currently active region, such as region 1 encoded with its associated encoder thread, for said receiver UE. The encoded region is then delivered to the receiver UE as viewport-dependent delivery.

Figure 9:
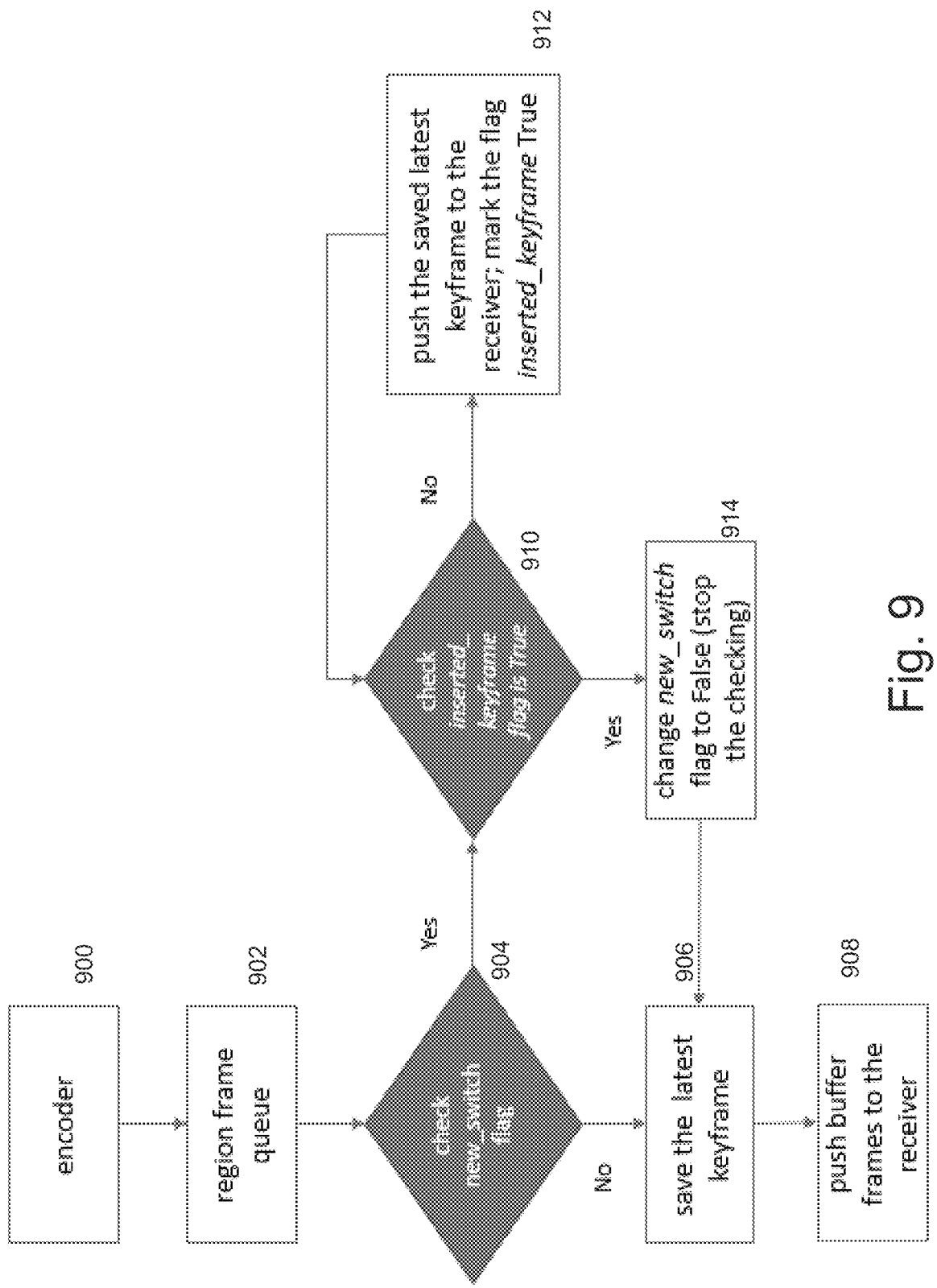
FIG. 9 an example implementation for inserting the key frame according to an embodiment.

When a receiver UE switches from one region to another, for example from region 1 to region 2, a key frame is required to be encoded into region 2 by its associated encoder thread for the receiver UE to be able to decode the new content. FIG. 9 shows an example implementation for inserting the key frame. For each region, the associated encoder thread (900) forms a buffer or a queue of frames (902), where the latest key frame for every region is cached (906) for the corresponding latest non-keyframes (e.g. P-frames) in the queue until a new key frame (e.g. I-frame) is available. Without any change in the regions, the buffered frames are delivered (908) to the receiver UE.

When a receiver UE switches to a new region (i.e., technically connects to a new queue), it is detected by a new_switch flag (904), the cached I-frame is sent (912) to the receiver UE prior to the non-keyframes in the queue. If a check (910) reveals that the first queue element is the key frame, the non-keyframes in the queue can be used. The check operation is carried out once and it may be ended by setting (914) the new_switch flag to false. A new check is carried out when a new region switch happens.

In the above examples, the FOV of the regions has been defined in horizontal direction, i.e. as the azimuth range, only. For example, the regions defined in FIG. 6 may not cover the full elevation range.

According to an embodiment, the method comprises determining two polar regions for the 360-degree video content. Thus, two additional polar regions may be defined that cover the full azimuth range (0-360 degrees) but limited elevation range (e.g., 30-90 degrees and −30--90 degrees). The polar regions may have the same resolution as the other regions.

Since redefining the elevation causes temporal inter prediction to perform poorly, the conditions for redefining FOV region with a new elevation range may have stricter conditions. If new receivers are expected to join the thread with the redefined regions with the new elevation range, the key frame is expected and can motivate the redefinition also in light of other aspects.

According to an embodiment, the method comprises inserting key frames periodically into the encoded viewport presentation of the region provided to the client device.

Accordingly, a media server/MRF may switch from forced insertion of key frames to periodic key frames if switching is frequent and/or the number of receivers is so large that managing forced insertions is more detrimental in terms of processing and bandwidth consumption. The choice between periodic key frame insertion and a forced/request based key frame insertion may be performed based on the use case requirement. For example, a person viewing a real-time low latency video stream may have poor user experience if required to frequently wait while switching between independently encoded regions. In contrast, in situation where the expectation for a key frame refresh is rare (due to stable viewport) but frequent new receiver UEs are joining to the same regions, periodic refresh may result in longer periods for switching between independently encoded regions but may not have any impact on the viewing experience. This can be a session negotiation parameter to make a choice between periodic key frame and forced/request based key frame insertion, carried out for example via a FIR CCM (Full Intra Request Codec Control Message) of RTCP.

In some embodiments, a mix of both approaches may be applied, where a new joining receiver UE is required to wait for periodic refresh while the receiver UE already attending the session can perform FIR CCM to have seamless viewport changes with consistently good quality viewport.

The frequency of region redefinition may be controlled based on the following aspects:
- If the redefinition requires no insertion of new key frame (the receivers for the thread and the elevation of the region remain same), the redefinition can be more frequent.
- The media server may be configured to support a maximum number of concurrent FOV regions, whereupon the redefinition is not motivated by reducing the number of these threads but only to minimize switching.
- A receiver UE with frequent region oscillation may be switched to a larger FOV (if present) instead of redefining the FOV region.

Figure 10:
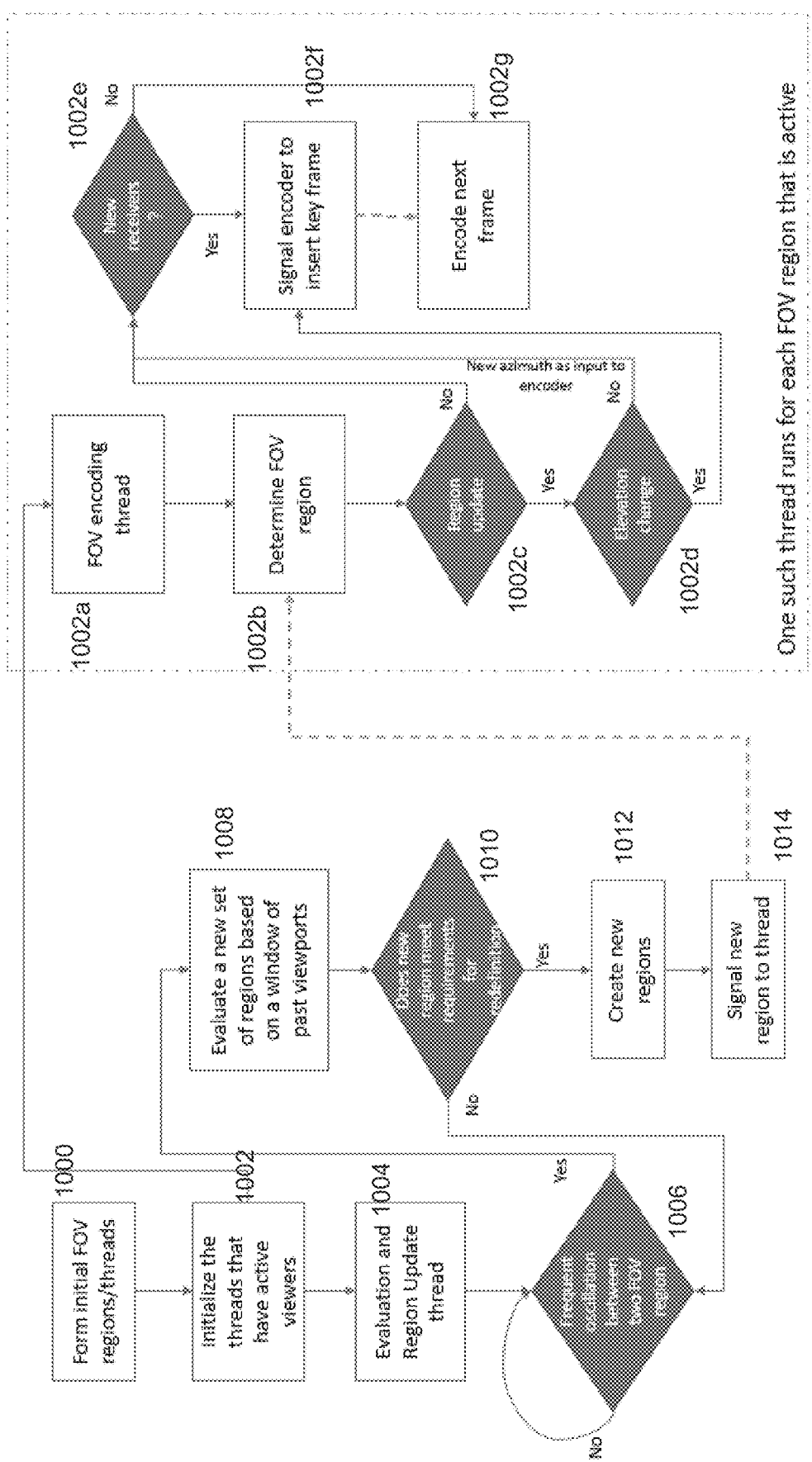
FIG. 10 shows a flow chart for a sender apparatus to perform some of the embodiments.

FIG. 10 show a flow chart for a sender apparatus (such as a media server or an apparatus comprising a Media Resource Function (MRF)) to perform some of the embodiments described herein. The operation starts by forming (1000) initial FOV regions and assigning the corresponding encoding threads. Only those encoding threads are initialized (1002), whose regions correspond to the viewport orientation requested by any of receiver UEs; i.e. encoding threads are initialized only for active regions. A need for region updates is checked (1004).

The process of initiating the encoding thread and checking the need for region updates is carried out separately for each active region and its corresponding encoding thread, and it is depicted on the right-hand side of FIG. 10. Therein, the encoding thread is initialized (1002*a*), and the FOV regions are determined (1002*b*). It is checked if region updates are required in azimuth (1002*c*) or elevation (1002*d*) direction; if yes, a new key frame is requested (10020, otherwise it is checked (1002*e*), if any new receiver UEs have joined the FOV region. If yes, again a new key frame is requested (10020, otherwise the encoding process continues (1002*g*) with the next frame.

The operation may include a continuous loop of checking (1006) whether one or more of the receiver UEs continuously oscillates between two FOV regions. If such occurrence is detected, a new set of regions may be estimated (1008) based on the recent viewports of the receiver UEs. The process may involve checking (1010) whether the estimated new set of regions complies with predetermined requirements for a redefinition of the regions. If the requirements are met, the new set of regions is created (1012) and signalled (1014) to the corresponding encoding thread(s).

According to an embodiment, the number of regions and their degree of overlap is fixed, and the redefinition of the regions is carried out as a sliding FOV such that each region is slid an equal amount in the same direction when the regions are redefined.

According to another embodiment, the number of regions is fixed but their extent of overlap may change. According to an embodiment, the sliding FOV is managed such the sliding of one region does not directly influence the sliding of another region at all. In another embodiment, the sliding of one region influences the sliding of one or more other regions but the extent is not the same for all of them. According to an embodiment, the regions cover the full extent of the 360-degree video such that at least one region is available for any possible viewport. The region may be composed of subpictures.

It is noted that a switch from one region to another, or the redefinition of the region, may not require any SDP renegotiation, since the resolution (defined e.g. in "imageattr" syntax) and the bitrate can be kept constant across different regions, even with different FOV. The change of the region's FOV (in terms of azimuth and/or elevation) may be signalled in-band to avoid any SDP renegotiation. If the resolution is different for different regions, additional signalling may be required to signal the resolution, possibly as in-band signalling (e.g. SEI messages) or out-of-band signalling (e.g. SDP, RTP header extensions).

Key frames can also be sent as follows:
Long term reference pictures (IRAP) are created and sent to any new receiver joining the FOV region thread.
The key frame will have the same timestamp for all RTP streams (different receivers)
When a new IRAP is added, it becomes the new long term reference picture and old one is discarded.
A DRAP (Dependent Random Access Picture) is inserted when a new receiver joins.
When a new (subsequent) IRAP is generated, it is sent to all receivers.

In an implementation with a periodic reference picture for regions, the sender may define additional "fallback-regions" encoded with no dependent frames or with very short period for reference pictures (in comparison to the regular regions). For the sake of clarity, the term "regular regions" as used herein refers to the encoded regions that are normally sent to the receiver and that have a larger period for reference picture for efficient encoding and bitrate usage. The purpose of the fallback-regions is to provide decodable frames to the receiver for the new viewport region until the next keyframe of the regular region. The fallback-regions are transmitted to the receiver when it switches from one region to another and the time to the next keyframe for a regular region is greater than an acceptable threshold: fallback_switch_threshold. The receiver stream switches back from a fallback region to a regular region as soon as a new switching point (keyframe) is available for the regular region. The fallback regions may be encoded using a lower quality, lower frame rate and/or lower resolution than the regular regions to prevent unnecessary bit rate spike when they are used. They may be the same dimensions and positions as the regular regions or different.

In an embodiment of the implementation with fallback regions, a function may be defined such that it minimizes the impact on user experience. Aspects contributing to the function are the probability of the viewport exceeding the viewport margins before a switch, the time to next keyframe in the regular regions, the impact on user experience by switching to fallback region and the impact of switching to a regular region earlier than the next keyframe.

Figure 11:
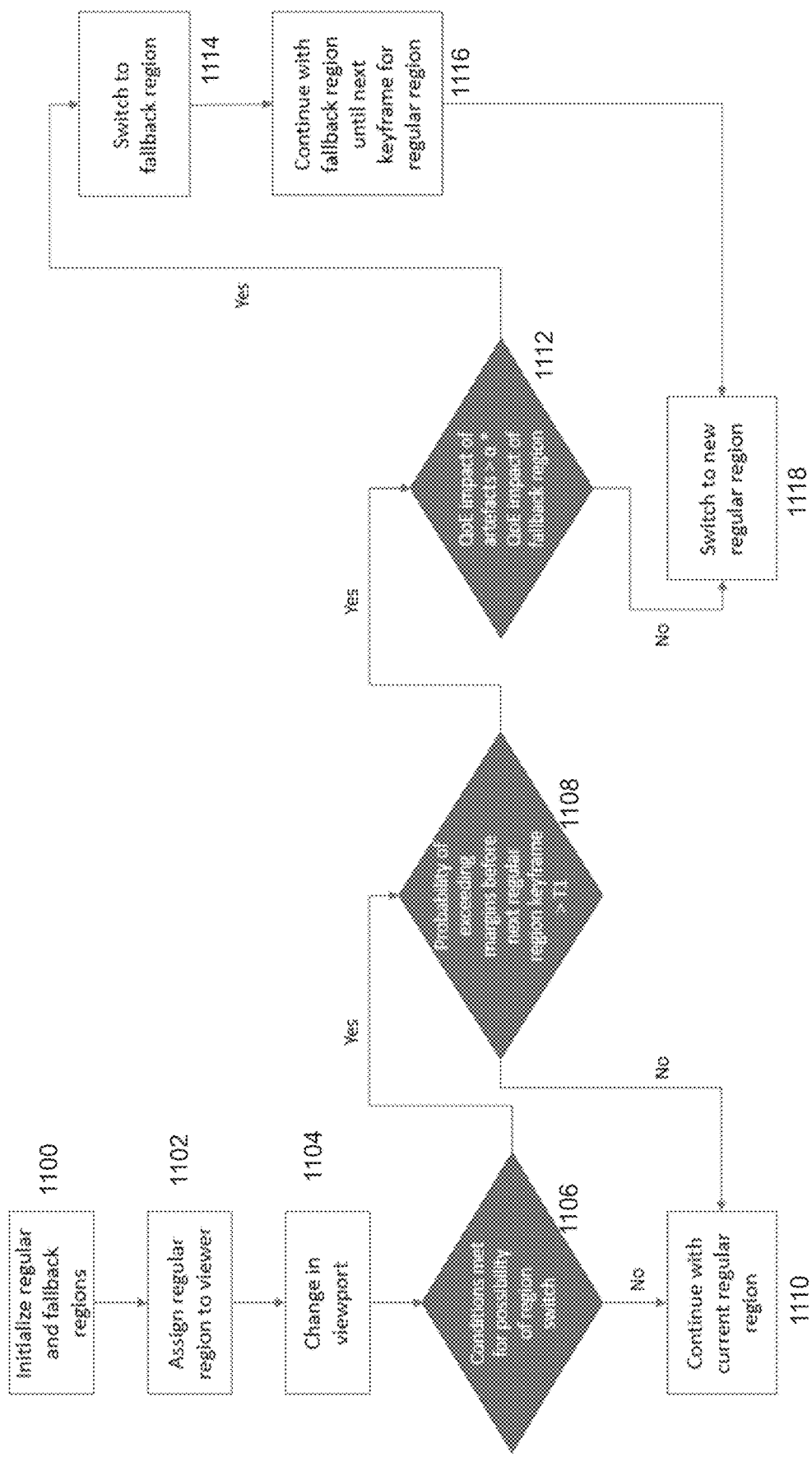
FIG. 11 shows a flow chart for using fallback regions according to some of the embodiments.

A possible implementation for such function is shown in FIG. 11. The sender initializes (1100) a set of regular and fallback regions for encoding and assigns (1102) a regular region to the viewer. When the viewport changes (1104), it is evaluated (1106) whether the new viewport meets the conditions for a possible switching of the region. If the conditions are met and the estimated probability (1108) that the viewport will exceed the margins before the next keyframe for the regular regions is above a threshold T1, then the region is prepared for a switch; otherwise, the operation continues (1110) with the current regular region. If the QoE impact of the artefacts (1112) that may be introduced by switching to a regular region are higher than the QoE impact of switching to a fallback region by a factor alpha ($\alpha$), the receiver switches (1114) to fallback region temporarily until the next regular region keyframe (1116). If the QoE impact of artefacts is lower, it switches (1118) to a new regular region.

The method and the related embodiments may be used for live 360-degree video streaming as well. Modifying the regions in a live streaming session may require an update of the manifest. An HTTP adaptive video streaming server may increase the segment duration when the regions are redefined to minimize region switches.

Figure 12:
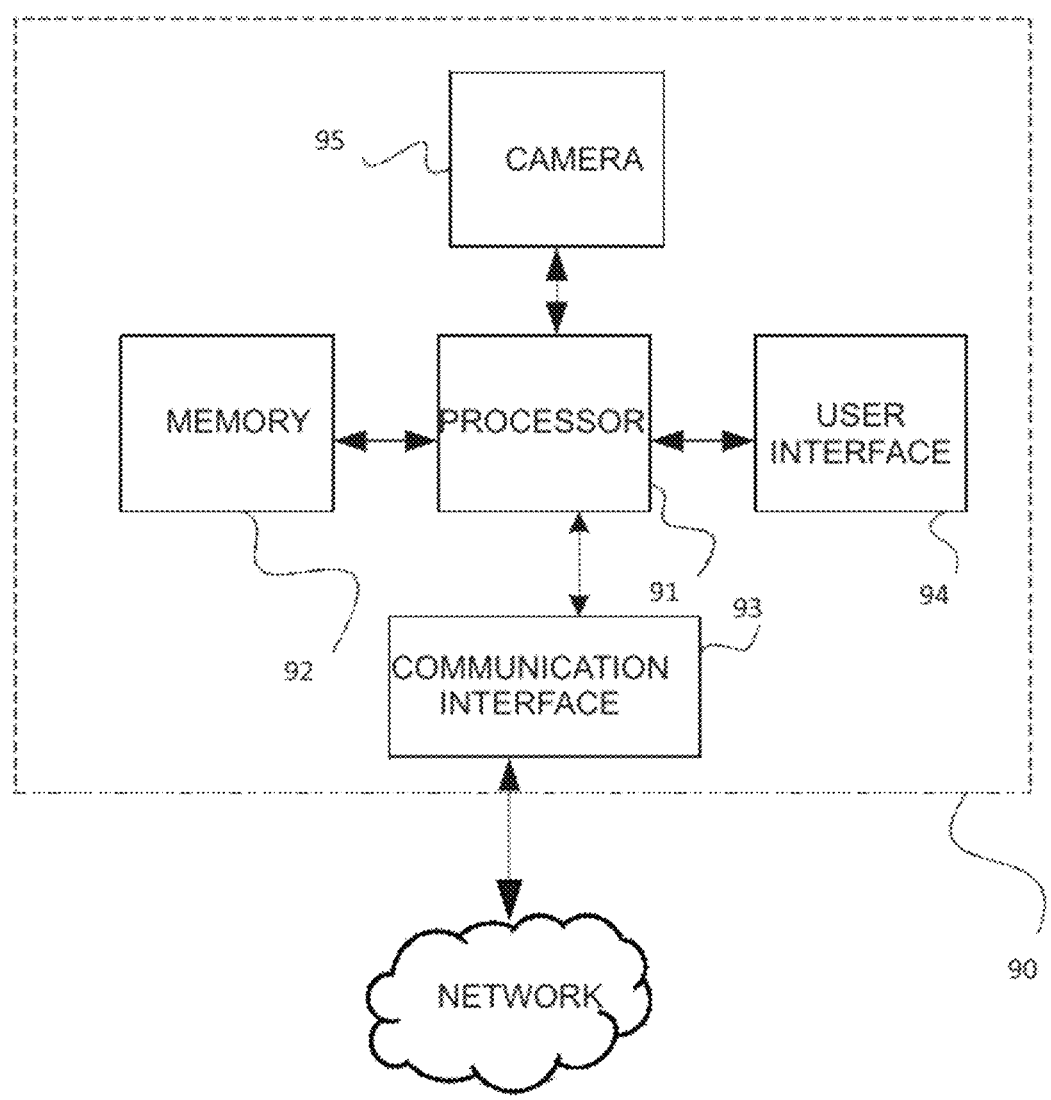
FIG. 12 shows an example of an apparatus suitable for implementing at least some of the embodiments.

An example of an apparatus is shown in FIG. 12. Several functionalities can be carried out with a single physical device, e.g. in a single processor, if desired. The apparatus 90 comprises a main processing unit 91, a memory 92, a user interface 94, a communication interface 93. The apparatus according to an embodiment, shown in FIG. 7, also comprises a camera module 95. The memory 92 stores data including computer program code in the apparatus 90. The computer program code is configured to implement the method according to flowchart of FIG. 4. The camera module 95 receives input data, in the form of video stream, to be processed by the processor 91. The communication interface 93 forwards processed data for example to a display of another device, such a HMD. When the apparatus 90 is a video source comprising the camera module 95, user inputs may be received from the user interface. If the apparatus 90 is a middlebox in a network, the user interface is optional, such as the camera module.

The various embodiments may provide advantages. For example, if the FOV of the region is encoded as a single region, it would have a higher coding efficiency than tiles/subpictures. Furthermore, the number of subpictures/tiles required for a single FOV does not change, so the bandwidth requirements are more predictable. The method and the embodiments provide a truly scalable solution, which is equally suitable for peer-to-peer and one-to-many viewport dependent delivery. Since the implementation is a bandwidth neutral and scalable solution with changing FoV and changing viewport, it is especially suitable for real-time communication. Moreover, the method and the embodiments are not limited to any specific video coding standard, such as AVC/HEVC encoding, but they can be operated with any codec. The method and the embodiments are neither limited to real-time 360-degree video, but they can be used for streaming 360-degree video delivery as well.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises obtaining information of available quality features of a sender device for providing omnidirectional visual media content; selecting one or more of the available quality features; and providing an indication of the selected one or more of the available quality features.

Thus, the apparatus may comprise at least one processor and at least one memory, said at least one memory stored with computer program code thereon, the at least one memory and the computer program code configured to, with the at least one processor, cause the apparatus at least to perform: obtain a 360-degree video content from a video source; project the 360-degree video content onto a 2D image plane; divide the projected 360-degree video content into a plurality of regions, wherein the regions are partly overlapping and each region covers a region of the 360-degree video content suitable for a viewport presentation; receive a request for a viewport orientation of the 360-degree video content from a client; and provide the client with a viewport presentation of the region corresponding to the requested viewport orientation.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure, as defined in the appended claims.

The invention claimed is:

1. An apparatus comprising:
    at least one processor; and
    at least one memory storing instructions that, when executed by the at least one processor, cause the apparatus at least to:
        obtain a 360-degree video content from a video source;
        project the 360-degree video content onto a two-dimensional image plane;
        divide the projected 360-degree video content into a plurality of regions, wherein the plurality of regions are at least partly overlapping, wherein a region of the plurality of regions enables at least one viewport presentation of the projected 360-degree video content;
        receive a request for a viewport orientation of the 360-degree video content from a client;
        provide, to the client, a viewport presentation of a region, of the plurality of regions, corresponding to the requested viewport orientation; and
        provide, to the client, a viewport presentation of a fallback region in response to the client switching between regions while a time to a next keyframe is greater than a threshold, wherein the fallback region comprises a region encoded with at least one of:
            a quality lower than a quality associated with, at least, the plurality of regions,
            a frame rate lower than a frame rate associated with, at least, the plurality of regions,
            a resolution lower than a resolution associated with, at least, the plurality of regions,
            no dependent frames, or
            a period for reference pictures that is shorter than a period for reference pictures associated with, at least, the plurality of regions.

2. The apparatus according to claim 1, wherein the at least one memory stores instructions that, when executed by the at least one processor, cause the apparatus to:
    carry out session negotiations with a plurality of client devices for a viewport-dependent delivery of the 360-degree video content; and
    determine, based on at least one of the plurality of client devices or parameters of the session negotiations, regions of the plurality of regions to be encoded with a same resolution.

3. The apparatus according to claim 1, wherein the at least one memory stores instructions that, when executed by the at least one processor, cause the apparatus to:
    obtain information from a plurality of client devices about motion patterns; and
    adjust the division of the projected 360-degree video content into the plurality of regions according to said information so as to minimize a need for region change.

4. The apparatus according to claim 1, wherein the at least one memory stores instructions that, when executed by the at least one processor, cause the apparatus to:
    encode respective regions of the plurality of regions with at least one of:
        a same encoding bitrate,
        a same encoding quality,
        a different encoding bitrate, or
        a different encoding quality.

5. The apparatus according to claim 1, wherein the at least one memory stores instructions that, when executed by the at least one processor, cause the apparatus to:
    determine that at least two regions correspond to the viewport orientation requested by the client, wherein the requested viewport orientation corresponds to an overlap between the at least two regions.

6. The apparatus according to claim 1, wherein the at least one memory stores instructions that, when executed by the at least one processor, cause the apparatus to:
    divide the projected 360-degree video content into a plurality of sets of regions, wherein regions in at least a first set of the plurality of regions have a larger field-of-view and regions in at least a second set of the plurality of regions have a smaller field-of-view.

7. The apparatus according to claim 1, wherein the at least one memory stores instructions that, when executed by the at least one processor, cause the apparatus to:
encode regions corresponding to viewport orientations requested by client devices.

8. The apparatus according to claim 1, wherein the at least one memory stores instructions that, when executed by the at least one processor, cause the apparatus to:
determine two polar regions for the 360-degree video content.

9. The apparatus according to claim 7, wherein the at least one memory stores instructions that, when executed by the at least one processor, cause the apparatus to at least one of:
insert key frames, at a first periodicity, into the viewport presentation of the encoded region provided to the client; or
insert the key frames, at a second periodicity, into the viewport presentation of the encoded region provided to the client in response to, at least, a frequency of switching between regions by the client, wherein the second periodicity is higher than the first periodicity.

10. The apparatus according to claim 1, wherein a number of the plurality of regions and their degree of overlap is fixed, and wherein the at least one memory stores instructions that, when executed by the at least one processor, cause the apparatus to:
redefine the plurality of regions as a sliding field-of-view such that respective regions of the plurality of regions are slid an equal amount in a same direction when the plurality of regions are redefined.

11. The apparatus according to claim 1, wherein a number of the plurality of regions and their degree of overlap is changeable.

12. The apparatus according to claim 11, wherein the at least one memory stores instructions that, when executed by the at least one processor, cause the apparatus to one of:
redefine the plurality of regions as a sliding field-of-view such that sliding of one region does not directly influence sliding of another region; or
redefine the plurality of regions as a sliding field-of-view such that sliding of one region influences sliding of at least one other region with a different degree of overlap.

13. A method, comprising:
obtaining a 360-degree video content from a video source;
projecting the 360-degree video content onto a two-dimensional image plane;
dividing the projected 360-degree video content into a plurality of regions, wherein the plurality of regions are at least partly overlapping, wherein a region of the plurality of regions enables at least one viewport presentation of the projected 360-degree video content;
receiving a request for a viewport orientation of the 360-degree video content from a client;
providing, to the client, a viewport presentation of a region, of the plurality of regions, corresponding to the requested viewport orientation; and
providing, to the client, a viewport presentation of a fallback region in response to the client switching between regions while a time to a next keyframe is greater than a threshold, wherein the fallback region comprises a region encoded with at least one of:
a quality lower than a quality associated with, at least, the plurality of regions,
a frame rate lower than a frame rate associated with, at least, the plurality of regions,
a resolution lower than a resolution associated with, at least, the plurality of regions,
no dependent frames, or
a period for reference pictures that is shorter than a period for reference pictures associated with, at least, the plurality of regions.

14. The method according to claim 13, further comprising:
carrying out session negotiations with a plurality of client devices for a viewport-dependent delivery of the 360-degree video content; and
determining, based on at least one of the plurality of client devices or parameters of the session negotiations, regions of the plurality of regions to be encoded with a same resolution.

15. The method according to claim 13, further comprising:
obtaining information from a plurality of client devices about motion patterns; and
adjusting the division of the projected 360-degree video content into the plurality of regions according to said information so as to minimize a need for region change.

16. The method according to claim 13, further comprising:
encoding respective regions of the plurality of regions with at least one of:
a same encoding bitrate,
a same encoding quality,
a different encoding bitrate, or
a different encoding quality.

17. The method according to claim 13, further comprising:
determining that at least two regions correspond to the viewport orientation requested by the client, wherein the requested viewport orientation corresponds to an overlap between the at least two regions.

18. The method according to claim 13, further comprising:
dividing the projected 360-degree video content into a plurality of sets of regions, wherein regions in at least a first set of the plurality of regions have a larger field-of-view and regions in at least a second set of the plurality of regions have a smaller field-of-view.

19. The method according to claim 13, further comprising:
encoding regions corresponding to viewport orientations requested by client devices.

20. The method according to claim 13, further comprising:
determining two polar regions for the 360-degree video content.

21. A non-transitory computer-readable medium comprising program instructions stored thereon for performing at least the following:
causing obtaining of a 360-degree video content from a video source;
projecting the 360-degree video content onto a two-dimensional image plane;
dividing the projected 360-degree video content into a plurality of regions, wherein the plurality of regions are at least partly overlapping, wherein a region of the plurality of regions enables at least one viewport presentation of the projected 360-degree video content;
causing receiving of a request for a viewport orientation of the 360-degree video content from a client; and causing providing, to the client, of a viewport presentation of a region, of the plurality of regions, corresponding to the requested viewport orientation; and causing providing, to the client, of a viewport presentation of a fallback region in response to the client switching between regions while a time to a next keyframe is greater than a threshold, wherein the fallback region comprises a region encoded with at least one of:
- a quality lower than a quality associated with, at least, the plurality of regions,
- a frame rate lower than a frame rate associated with, at least, the plurality of regions,
- a resolution lower than a resolution associated with, at least, the plurality of regions,
- no dependent frames, or
- a period for reference pictures that is shorter than a period for reference pictures associated with, at least, the plurality of regions.

* * * * *